United States Patent [19]

Boyer et al.

[11] 4,320,566
[45] Mar. 23, 1982

[54] METHOD OF RETROFITTING A HEAT EXCHANGER

[75] Inventors: Robert C. Boyer, Emmaus; George Williams, Chalfont; Herbert A. Wessner, Easton, all of Pa.

[73] Assignee: Ecolaire Incorporated, Malvern, Pa.

[21] Appl. No.: 155,342

[22] Filed: Jun. 2, 1980

[51] Int. Cl.³ .................. B23P 15/26; B23P 19/00
[52] U.S. Cl. .................. 29/157.4; 29/402.09; 29/157.3 C; 165/162
[58] Field of Search .............. 29/157.4, 402.09, 726, 29/402.11, 402.12, 402.14, 402.01, DIG. 3, 157.3 C; 165/162; 113/1 C, 118

[56] References Cited

U.S. PATENT DOCUMENTS

| | | | |
|---|---|---|---|
| 3,587,732 | 7/1971 | Burne | 29/157.4 |
| 3,637,008 | 1/1972 | Michel et al. | 165/162 |
| 3,751,783 | 8/1973 | Roberts, Jr. et al. | 29/157.4 |
| 4,210,202 | 7/1980 | Boyer et al. | 165/162 |

Primary Examiner—Francis S. Husar
Assistant Examiner—V. K. Rising
Attorney, Agent, or Firm—Seidel, Gonda, Goldhammer & Panitch

[57] ABSTRACT

A heat exchanger is retrofitted by removing old heat exchange tubes. If there is no access passage into the shell, an access hole is cut in a wall of the shell. Modules preformed from zig-zag elements are introduced through the access passage and assembled into a tube support panel within the shell between adjacent support plates. The heat exchanger is retubed so as to support the new tubes by the existing support plates and by said panels.

8 Claims, 5 Drawing Figures

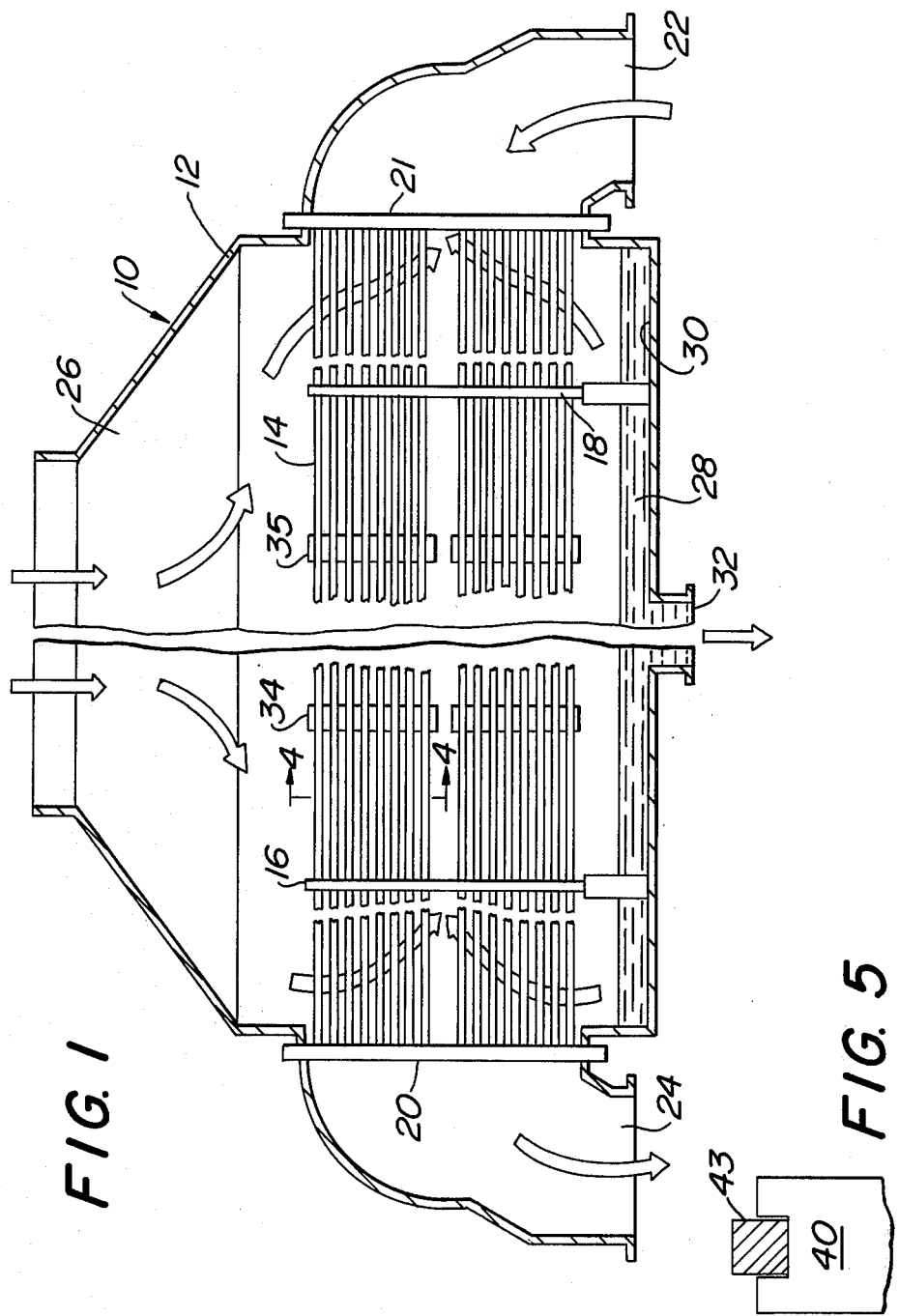

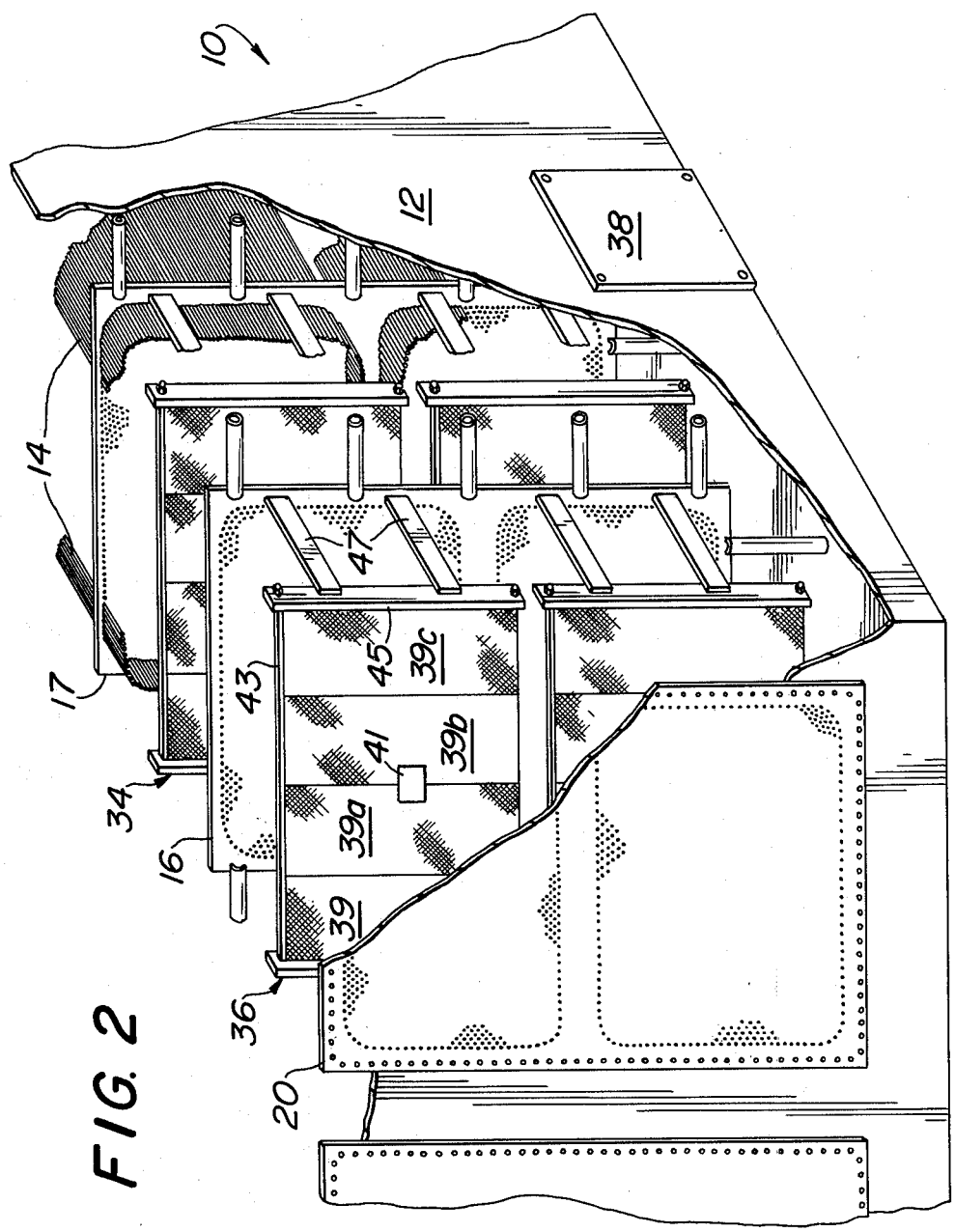

METHOD OF RETROFITTING A HEAT EXCHANGER

RELATED CO-PENDING APPLICATION

The zig-zag elements used herein are of the type disclosed in co-pending application Ser. No. 891,677 filed Mar. 30, 1978 and entitled Support For Heat Exchange Tubes, now U.S. Pat. No. 4,210,202.

BACKGROUND

Retrofitting heat exchangers such as steam condensers includes removing old heat exchange tubes and replacing them with new heat exchange tubes. Since retrofitting takes place 10 to 20 years or more subsequent to the design of the heat exchanger, it is desirable to take advantage of any improvements in heat exchange tubes when retrofitting a condenser. Frequently the new heat exchange tubes are made from a different material as compared with the old heat exchange tubes and have different characteristics. The new heat exchange tubes are frequently more flexible and/or have thinner walls than the old heat exchange tubes. If the new heat exchange tubes are merely substituted for the old tubes, various problems can occur such as vibration between tubes at the mid span between adjacent support plates.

When retrofitting a heat exchanger, there is no practical way in which a new support plate may be introduced into the heat exchanger shell between the existing support plates to provide the necessary support for the new tubes. Even if the new tubes are identical with the old tubes, it is desirable to provide added support for the new tubes within the shell to minimize any vibration. Heat exchangers designed 20 or more years ago were frequently constructed in a manner so that the distance between adjacent support plates was as much as 60 inches whereas present technology suggests that the support plates be not more than about 30 inches apart.

The problem solved by the present invention is how to retrofit a heat exchanger to provide the desired support within a shell without involving time-consuming and costly disassembly of the maze of hotwell support pipes and other structure.

SUMMARY OF THE INVENTION

The present invention is directed to a method of retrofitting a heat exchanger having heat exchange tubes within an outer shell. Old heat exchange tubes are removed in a conventional manner. An access passage is provided or utilized to provide access to an area between two adjacent support plates. A tube support panel is assembled in the shell between the support plates from preformed modules. Openings in the panel are aligned with openings in the adjacent support plates by use of temporary tubes or by using a small number of the new tubes. The panels are then secured in place so that retubing may commence or continue. The panels space adjacent tubes from each other to inhibit midspan collision of tubes.

It is an object of the present invention to provide a novel method for retrofitting a heat exchanger such as a steam condenser.

It is another object of the present invention to provide a method for retrofitting a heat exchanger in a manner which provides additional support for heat exchanger tubes to minimize vibration damage by contact between adjacent tubes at a midspan between existing support plates.

It is another object of the present invention to provide a method of retrofitting a heat exchanger which involves as few as two workers without costly disassembly operations.

Other objects will appear hereinafter.

For the purpose of illustrating the invention, there is shown in the drawing a form which is presently preferred; it being understood, however, that this invention is not limited to the precise arrangements and instrumentalities shown.

FIG. 1 is a diagramatic sectional view of a steam condenser retrofitted in accordance with the present invention.

FIG. 2 is a partial perspective view of the steam condenser shown in FIG. 1.

FIG. 5 is a sectional view taken along the line 5—5 in FIG. 4.

DETAILED DESCRIPTION

Figure 4:
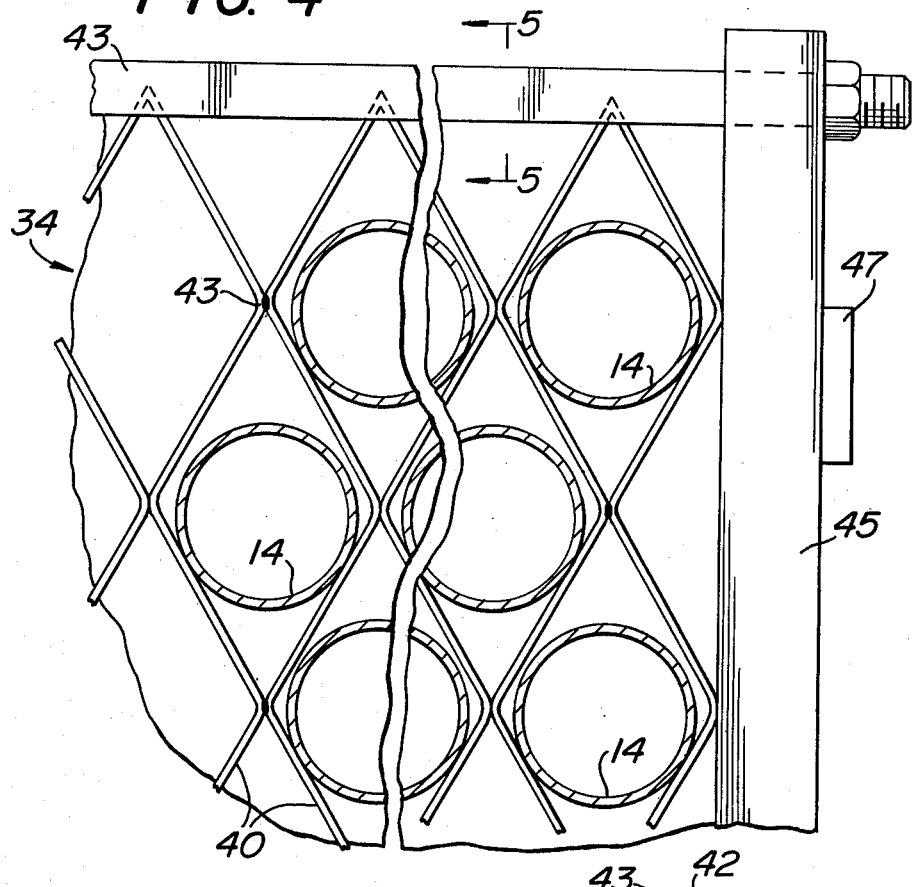
FIG. 4 is a sectional view taken along the line 4—4 in FIG. 1.

Referring to the drawing in detail, wherein like numerals indicate like elements, in FIGS. 1 and 2 there is shown a heat exchanger such as a steam condenser designated generally as 10. The steam condenser 10 includes an outer shell 12 which may be circular or rectangular in section. A plurality of rows of tubes 14 are disposed within the shell 12 as part of two tube bundles as shown. The tubes are supported intermediate their ends by support plates 16, 17, etc. The tubes are also supported at their ends by one of the tube sheets 20, 21. The shell 12 has a liquid inlet 22 communicating with one end of the tubes 14 and a liquid outlet 24 communicating with the other end of the tubes 14. The shell 12 has a gas inlet 26 at a dome on its upper end and a well 30 at its lower end. Condensate 28 is collected in the well 30 and may be discharged continuously or selectively through a valved outlet 32.

The distance between tube sheet 20 and the support plate 16 as well as the distance between support 16 and the support plate 17 is typically about 60 inches. A panel 34 is provided between support plates 16 and 17. A panel 36 is provided between tube sheet 20 and support plate 16. A panel 35 is provided between support plate 18 and the next such support plate. A similar panel is provided between each adjacent support plate. The panels are identical.

Most shells 12 have an access passage for entering into the shell. If there is no access passage, an access hole is cut into the shell at an appropriate elevation while taking into consideration various pipes and other structure which should not be disassembled. For the purpose of disclosure, it is assumed that the shell 12 has an access passageway closed by a removable covery 38 as shown in FIG. 2. Preformed panel modules 39, 39a, 39b and 39c are introduced through the passageway into the interior of the shell 12. The size of the modules will vary with the size of the condenser 10. Typically, a module 39 is 2 or 3 feet wide and 6 to 10 feet high. Modules of those sizes are sufficiently light in weight so as to be handled by only two men.

Figure 3:
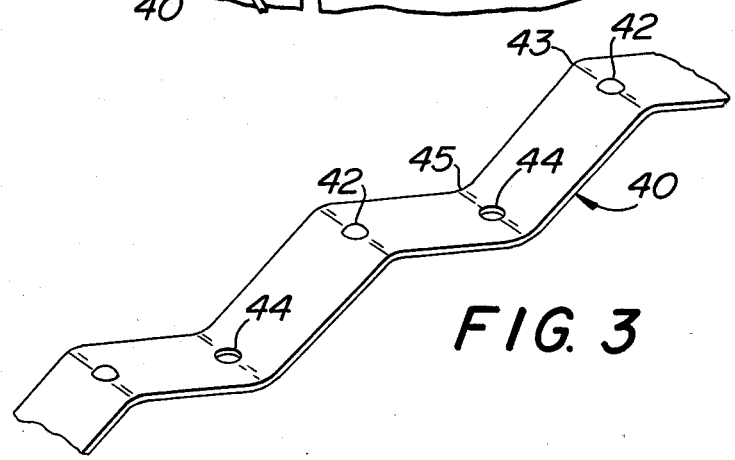
FIG. 3 is a partial perspective view of a zig-zag element.

The modules may be identical or modules 39a and 39b may have mating notches which form an opening 41 for accomodating any existing piping. Each module is comprised of a plurality of zig-zag elements 40. See FIGS. 3 and 4. The elements 40 are preferably made of stainless steel or other suitable non-corrosive material and have a width greater than the diameter of the tubes 14. Each element 40 has a protrusion 42 on an upper apex 43 and a recess or hole 44 on each lower apex 45.

Each protrusion 42 is adapted to mate with the recess or hole 44 on the panel next adjacent thereto. As shown more clearly in FIG. 4, each of the tubes 14 has line contact with two adjacent converging surfaces defining diamond shaped openings. The elements 40 of each module are interlocked with one another and then are spot welded at mating apexes in a number of locations so as to provide a preformed module which may easily be handled by two men.

The mating side edges of panels 39, 39a, 39b and 39c are interlocked with one another and aligned with one another so as to form the panel 36. The upper and lower ends of the modules are notched so as to receive a tie rod 43. Tie rod 43 is threaddedly coupled at its ends to vertically disposed side frames 45. The tie rods are tightened so as to provide clamping pressure as desired. A pair of horizontally disposed braces 47 couple the side frames 45 to one or both of the adjacent support plates such as plate 16 outside the hole pattern. See FIG. 2. The panels are arranged to space the adjacent tubes 14 from each other to inhibit mid span collision of tubes.

The preferred sequence of steps for retrofitting the condenser 10 are as follows. Preformed modules 39, 39a, 39b and 39c as well as the tie rods 43, side frames 45, and braces 47 are deposited as a set for each tube bundle between each of the support plates. A similar set is deposited between the tube sheets 20, 21 and the adjacent support plate. One operator is disposed outside the shell 12 while another operator is disposed inside the shell 12. The support plates 16, 17, 18, etc are generally spaced 2 to 3 feet from the bottom of the shell so that the sets of pieces may be moved longitudinally of the shell beneath the support plates.

At each location referred to above, the modules are assembled into a panel such as panel 36. If there are two or more tube bundles, a panel is assembled and secured in place for each tube bundle. The protrusions on the apexes of one module are mated with the holes on the apexes of the next adjacent module. The tie rods 43 are located in place and tightened. Thereafter, each panel is aligned so that the diamond shaped holes therein are in alignment with the tube holes in the support plate 16 and tube sheet 20 on opposite sides thereof.

Alignment of the panel 36 may be accomplished in two different ways depending upon a number of factors. If down time associated with the condenser is not critical, the preferred alignment involves partial retubing of the condenser 10 with a small number of new tubes which only extend through the tube sheet 20, through the panel 36, and through the first support plate 16. The remainder of the new tubes is disposed outside of the shell 12. Only three or four of the new tubes are needed for alignment of each of the modules of the panel 36. During the insertion or passage of the new tubes through the panel 36, the two operators are standing within the shell and supporting the panel 36. Once the new tubes have traversed the tube sheet 20, the panel 36, and the tube support plate 16, the operators may allow the panel 36 to be supported by the tubes. Thereafter, the braces 47 are attached and secured in place so that the panel 36 is supported by the adjacent tube sheet or support plate such as support plate 16. If there is more than one tube bundle, the process is repeated for other tube bundle(s).

Thereafter, the panel 34 is assembled in the same manner between the support plates 16, 17. The new tubes are then advanced so as to extend through the diamond shaped openings in panel 34 and the support plate 17. Panel 34 is then secured in place in the same manner as panel 36. The process is repeated at each location between adjacent support plates.

A second method of aligning the panels is preferred when time is of the essence and down time is critical. Alignment in this circumstance is attained by using short lengths of tubing or rods having a length of about 6 feet so that they may extend through aligned holes in adjacent support plates. The rods or tubes are only temporary and are removed after the panels are secured in place. The use of such temporary short rods or tubes enables a plurality of teams of operators to be working simultaneously at different locations along the length of the shell. After all of the panels are in place, all of the temporary rods or tubes are removed. Thereafter, the condenser is retubed in a conventional manner. Retubing is generally done in horizontal rows, one row at a time beginning either at the top or at the bottom of the support plates and tube sheets.

Vibration and/or contact between adjacent tubes 14 is inhibited by the use of the panels 34, 36, etc. Such panels are made from elements 40 having a width greater than the diameter of the tubes 14. The ratio of support length to support spacing is therefore greater which generally decreases the structuring damage of the new tubes when subjected to excitation force such as normal hydrodynamic loading. When hydrodynamic loads are applied during operation of the condenser 10, rotation of the tubes at the tube-to-support junction is restricted more than that attained by a conventional drilled hole with single line contact in a support plate. This angular restriction enables the tubes to resist greater magnitudes of hydrodynamic loading and inhibits contact of adjacent tubes at their midspan.

The weight of the modules is minimal whereby two workers can readily transport and position the same. The small physical dimensions and weight of the modules allows manual minipulation through the maze of hotwell support pipes and other existing structure without involving time-consuming and costly disassembly operations. No special lifting or handling tools are required. Minimum erection tools are required. No modifications in design of the existing shell are required since the panels are secured to the support plates. Retubing can be accomplished with new tubes which are more flexible and less costly.

The present invention may be embodied in other specific forms without departing from the spirit or essential attributes thereof and, accordingly, reference should be made to the appended claims, rather than to the foregoing specification, as indicating the scope of the invention.

I claim:

1. A method of retrofitting a exchanger having heat exchange tubes within an outer shell comprising removing old heat exchange tubes, attaining access to an area between existing support plates disposed within the shell, introducing panel modules into said area, assembling a tube support panel from said modules in said area, aligning holes in the panel with holes in the tube support plates, securing the panel in place at said area, retubing said shell with new heat exchange tubes using holes in the support plates and holes in the panel, and spacing the midspan of adjacent tubes from each other by said panel to inhibit midspan collision of tubes between adjacent support plates.

2. A method in accordance with claim 1 wherein the assembly of modules to form a panel includes coupling the modules to each other by a mating protrusion on an apex of a zig-zag member forming part of one module with a mating hole or recess on the apex of a zig-zag member forming part of an adjacent module.

3. A method in accordance with claim 2 wherein said step of assembling a panel includes coupling modules together by tie rods parallel to adjacent support plates, and coupling the tie rods of each panel to vertically dispose side frame members.

4. A method in accordance with claim 1 wherein said step of securing the panels in place includes attaching the panel to an adjacent support plate.

5. A method in accordance with claim 1 wherein said step of aligning the panel includes introducing a plurality of tubes or rods through aligned holes in adjacent support plates and mating holes in the panel therebetween.

6. A method in accordance with claim 5 wherein said aligning step includes using new tubes to perform said aligning step.

7. A method in accordance with claim 1 including assembling and aligning a panel between a pair of adjacent support plates at one location in the shell while simultaneously assembling and aligning another panel between adjacent support plates at a different location within the shell.

8. A method of retrofitting a heat exchanger comprising removing old heat exchange tube supported within an outer shell by transversely disposed support plates, assembling a tube support panel from modules in an area between adjacent support plates, said assembling step including using modules made from zig-zag elements coupled together to form diamond-shaped tube openings, aligning said panel tube openings with holes in adjacent support plates, securing said panel in position between adjacent support plates, and retubing the shell with new heat exchange tubes made from material different from the material of the old heat exchange tubes.

* * * * *